(12) United States Patent
Raichle et al.

(10) Patent No.: US 8,128,904 B2
(45) Date of Patent: Mar. 6, 2012

(54) PROCESS FOR PREPARING A MULTIELEMENT OXIDE COMPOSITION COMPRISING THE ELEMENT IRON IN OXIDIC FORM

(75) Inventors: Andreas Raichle, Ludwigshafen (DE); Holger Borchert, Offstein (DE); Klaus Joachim Müller-Engel, Stutensee (DE); Ulrich Cremer, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 135 days.

(21) Appl. No.: 12/013,693

(22) Filed: Jan. 14, 2008

(65) Prior Publication Data

US 2008/0171897 A1 Jul. 17, 2008

Related U.S. Application Data

(60) Provisional application No. 60/885,037, filed on Jan. 16, 2007.

(30) Foreign Application Priority Data

Jan. 16, 2007 (DE) .......................... 10 2007 003 076

(51) Int. Cl.
   *B01J 23/00* (2006.01)

(52) U.S. Cl. .............. 423/594.1; 252/519.1; 252/519.13
(58) Field of Classification Search ............... 423/594.1, 423/138; 502/311, 313, 321; 252/519.1, 252/519.13
See application file for complete search history.

(56) References Cited

U.S. PATENT DOCUMENTS

| | | | |
|---|---|---|---|
| 3,218,135 A * | 11/1965 | Alexander et al. ............ 428/565 |
| 3,825,600 A | 7/1974 | Ohara et al. |
| 4,212,766 A * | 7/1980 | Brazdil et al. ................ 502/205 |
| 5,051,201 A * | 9/1991 | Mueller et al. ............ 252/62.59 |
| 6,613,940 B1 | 9/2003 | Nishimura et al. |
| 2005/0131253 A1 | 6/2005 | Teshigahara et al. |
| 2007/0032377 A1 | 2/2007 | Hibst et al. |

FOREIGN PATENT DOCUMENTS

| | | |
|---|---|---|
| DE | 10 2005 035 978 A1 | 2/2007 |
| DE | 102005037678 | 2/2007 |
| EP | 1080781 | 3/2001 |
| JP | 60-232245 | 11/1985 |

* cited by examiner

*Primary Examiner* — Steven Bos
(74) *Attorney, Agent, or Firm* — Oblon, Spivak, McClelland, Maier & Neustadt, L.L.P.

(57) ABSTRACT

A process for preparing a multielement oxide composition comprising the element iron in oxidic form, in which the source of the elemental constituent of iron used is an aqueous iron nitrate solution whose preparation comprises the melting of a solid hydrate of iron nitrate.

13 Claims, No Drawings

PROCESS FOR PREPARING A MULTIELEMENT OXIDE COMPOSITION COMPRISING THE ELEMENT IRON IN OXIDIC FORM

The process for preparing a multielement oxide composition which comprises the element iron and at least one elemental constituent other than oxygen in oxidic form, in which sources of the elemental constituents of the multielement oxide compositions are used to obtain a dry mixture comprising the elemental constituents as a precursor composition, and the precursor composition, as such or shaped to a shaped body, is treated thermally at elevated temperature, the source used for the elemental constituent of iron being an aqueous solution of iron nitrate.

Multielement oxide compositions which comprise the element iron and at least one elemental constituent other than oxygen in oxidic form are known (cf., for example, US 2005/0131253 A1, U.S. Pat. No. 3,825,600, EP-A 1080781 and DE-A 102005035978). One of their uses is as active compositions for catalysts which are capable of catalyzing heterogeneously catalyzed gas phase partial oxidations of a wide variety of different organic starting compounds (for example of propylene to acrolein, of isobutene to methacrolein, of n-butane to maleic anhydride, of propylene to acrylonitrile, or of isobutene to methacrylonitrile).

A complete oxidation of an organic compound with molecular oxygen is understood to mean here that the organic compound is converted under the reactive action of molecular oxygen such that all of the carbon present in the organic compound is converted to oxides of carbon and all of the hydrogen present in the organic compound is converted to oxides of hydrogen. All different reactions of an organic compound under the reactive action of molecular oxygen are summarized here as partial oxidations of an organic compound.

In particular, partial oxidations shall refer here to those reactions of organic compounds under the reactive action of molecular oxygen in which the organic compound to be oxidized partially, after the reaction has ended, comprises at least one oxygen atom more in chemically bound form than before the partial oxidation is performed (the term "partial oxidation" in this document shall also comprise partial ammoxidation, i.e. partial oxidation in the presence of ammonia).

In a heterogeneously catalyzed partial gas phase oxidation, the catalyst bed has the task of causing the desired gas phase partial oxidation to proceed preferentially over complete oxidation. The chemical reaction is effected when the reaction gas mixture flows through the catalyst bed during the residence time of the reaction gas mixture therein.

Typically, the reactants in the reaction gas mixture are diluted by a diluent gas which behaves essentially inertly, and whose constituents remain chemically unchanged under the conditions of the heterogeneously catalyzed gas phase partial oxidation—each constituent taken alone—to an extent of more than 95 mol %, preferably to an extent of more than 99 mol %.

In addition to oxygen and iron, the catalytically active oxide composition may comprise only one other element or more than one other element (multielement oxide compositions). Particularly frequently, the catalytically active oxide compositions used are those which, as well as iron, also comprise at least one other metallic, especially transition metal, element. In this case, reference is made to multimetal oxide compositions. Typically, the multielement oxide compositions (especially the multimetal oxide compositions) are not simple physical mixtures of oxides of the elemental constituents but rather heterogeneous and/or homogeneous mixtures of complex polyoxy compounds of these elements.

Multielement oxide compositions are prepared typically in such a way that suitable sources of their elemental constituents are used to obtain a (preferably very intimate and, appropriately from an application point of view, finely divided) dry mixture with a composition corresponding to their stoichiometry, and, as such or shaped to a shaped body, it is treated thermally at elevated temperature (frequently from 150 to 650° C.).

Useful sources for the elemental constituents of the desired multielement oxide composition include in principle those compounds which are already oxides or those compounds which can be converted to oxides by heating (thermal treatment) (at least in the presence of gaseous molecular oxygen). However, the oxygen source may also be part of the precursor mixture, for example in the form of a peroxide.

In addition to the oxides, useful such sources (starting compounds) include in particular halides, nitrates, formates, oxalates, citrates, acetates, carbonates, amine complexes, ammonium salts and/or hydroxides. Compounds such as $NH_4OH$, $(NH_4)_2CO_3$, $NH_4NO_3$, $NH_4CHO_2$, $CH_3COOH$, $NH_4CH_3CO_2$ and/or ammonium oxalate which, like the aforementioned constituents, disintegrate and/or can be decomposed in the course of the thermal treatment to compounds which escape essentially in gaseous forms may additionally be incorporated into the precursor mixture.

The dry precursor mixture (the dry precursor composition) may additionally comprise added finely divided reinforcing assistants such as microfibers of glass, asbestos, silicon carbide and/or potassium titanate. Shaping assistants, for example boron nitride, graphite, carbon black, polyethylene glycol, stearic acid, starch, polyacrylic acid, mineral oil or vegetable oil, water, boron trifluoride, glycerol and cellulose ethers, may also be added (cf., for example, DE 102005037678.9).

The preferably intimate mixing of the starting compounds (sources) for preparing the dry precursor composition is effected, appropriately from an application point of view, in wet form. Typically, the starting compounds are mixed with one another at least partly in the form of an aqueous solution and/or suspension. However, useful solvents and/or suspension media also include liquids other than water, for example methanol, ethanol, isobutanol, benzene, diethyl ether and other organic solvents.

Subsequently, the wet formulation is converted by drying and, if appropriate, subsequent comminution to a dry mixture from which the multielement oxide active composition is obtained by thermal treatment as such or after shaping to a shaped body.

In the context of the preparation of multielement oxide compositions relevant in accordance with the invention in the prior art processes, the sources used for the elemental constituents iron are normally iron (II) nitrate and/or iron(III) nitrate (the Roman numeral represents the oxidation state of the iron), and, for reasons of very intimate wet mixing of the different sources to be used to prepare the precursor composition, appropriately from an application point of view, as an aqueous solution (e.g. U.S. Pat. No. 3,825,600, US-2005/0131253 A1 and EP-A 1080781).

The aqueous solution of iron nitrate is prepared by dissolving iron(II) nitrate ($Fe(NO_3)_2$) or iron(III) nitrate ($Fe(NO_3)_3$) and a hydrate of the aforementioned iron nitrates which is solid at a temperature of 25° C. or a pressure of 1 bar (e.g. $Fe(NO_3)_2.6H_2O$ or $Fe(NO_3)_3.6H_2O$ or $Fe(NO_3)_3.9H_2O$ or $Fe(NO_3)_2.9H_2O$ or a mixture of different aforementioned salts in water, or in an aqueous solution (this may already comprise other chemical constituents in dissolved form).

However, such a procedure is disadvantageous especially when the preparation is effected on the industrial scale. The reason for this is in particular that iron nitrates and their hydrates are hygroscopic and therefore tend to agglutinate. Their industrial scale supply form therefore generally comprises coarse, comparatively hard lumps of irregular size.

In other words, the material is normally coarse material which has a barely free-flowing form which thus has only limited conveyability and, owing to the hardness, can be converted to such a form only with comparative difficulty even by comminution. A precise quantitative dosage in the course of preparation of an aqueous solution is therefore comparatively difficult and frequently inaccurate on the industrial scale.

It was therefore an object of the present invention to provide a form of iron nitrate better suited to the industrial scale preparation of aqueous iron nitrate solutions, which is firstly comparatively readily available and secondly can both be conveyed in a simple manner and metered at a precise point.

Accordingly, a process has been found for preparing a multielement oxide composition which comprises the element iron and at least one elemental constituent other than oxygen in oxidic form, in which sources of the elemental constituents of the multielement oxide compositions are used to obtain a dry mixture comprising the elemental constituents as a precursor composition, and the precursor composition, as such or shaped to a shaped body, is treated thermally at elevated temperature, the source used for the elemental constituent of iron being an aqueous solution of iron nitrate, wherein the preparation of the aqueous iron nitrate solution comprises the melting of a hydrate of iron nitrate which is in the solid state at a temperature of 25° C. and a pressure of 1 bar.

The basis of the inventive procedure is the fact that the melting point of hydrates of iron nitrate which are in the solid state at 25° C. and a pressure of 1 bar is comparatively low at standard pressure (1 bar). According to CRC Handbook of Chemistry and Physics, CRC Press, Inc. Boca Raton, Fla., 64$^{th}$ Edition, 1984, for example, the melting point of $Fe(NO_3)_2.6H_2O$ at standard pressure is 60.5° C., that of $Fe(NO_3)_3.6H_2O$ is 35° C. and that of $Fe(NO_3)_3.9H_2O$ is 47.2° C.

Melting of the aforementioned hydrates of iron nitrate at comparatively low temperatures (i.e. under comparatively gentle conditions) thus allows, in a particularly simple manner, aqueous solutions of iron nitrate to be obtained directly. Such aqueous solutions can additionally be conveyed in a simple manner and can be metered at a precise point. They may, for example, directly be the source of iron nitrate to be used in accordance with the invention as such. However, it will be appreciated that it is also possible, for example, for water or any water-miscible organic solvent (and/or the source of one or more other elemental constituents of the multielement oxide composition (if appropriate in solution)) to be added to them before they are used as the iron nitrate source in the process according to the invention.

In a manner appropriate from an application point of view, the procedure will be to initially charge a melt of the appropriate iron nitrate hydrate in a jacketed vessel (tank) at about standard pressure and to conduct warm water through the intermediate space enclosed by the two walls if required (if there is no such need, water is present in the intermediate space). Appropriately, the water is connected on a warm water circuit. The temperature of the circulation water is generally above the melting point of the iron nitrate hydrate (preferably $\geq 10°$ C. above the melting point of the iron nitrate), but normally at a value of $\leq 98°$ C. If required (i.e. when the internal vessel temperature begins to fall below the melting point of the iron nitrate hydrate), the opening of a control valve in the warm water circuit results in warm water passing through the intermediate space enclosed by the two walls in order to reestablish an internal vessel temperature which has exactly the appropriate melting point of the iron nitrate hydrate, as a result of which the melt present in the vessel is kept liquid. In the case of a melt of $Fe(NO_3)_3.9H_2O$, the internal vessel temperature would thus be kept at a value of 60.5° C. Advantageously, the vessel containing the melt (aqueous iron nitrate solution) is disposed on a balance. In this way, it is possible, in a skilful manner from an application point of view, to discharge the desired amount of the melt (of the aqueous solution) at any time for use in the process according to the invention. Subsequently, solid iron nitrate hydrate is supplemented into the remaining melt and melted in order thus to replenish the aqueous iron nitrate solution. Otherwise, the vessel comprising the iron nitrate melt is essentially closed. As an outlet for any gaseous decomposition products which form to a slight degree, it advantageously has a connection with comparatively small cross section to a ventilation system. In general, the aforementioned cross-sectional area will not be more than 50 cm². In order to prevent concentration of the solution, the pressure in the ventilation system in this case is preferably $\geq 950$ mbar abs., more preferably $\geq 980$ mbar abs. and most preferably $\geq 995$ mbar abs.

In general, this pressure will, however, not be more than 1100 mbar absolute (abs.). Preference is given to slightly reduced pressure compared to atmospheric.

Especially in the case of an $Fe(NO_3)_2.6H_2O$ melt, the melting will advantageously be performed under inert gas atmosphere. The inert gases used may, for example, be $N_2$, $CO_2$ and/or noble gases.

Advantageously in accordance with the invention, the remelting of solid iron nitrate hydrate will be effected with stirring in iron nitrate melt remaining in the jacketed vessel. In principle, it is, though, even possible to dispense with stirring. Typically, the exact Fe content of the solid iron nitrate hydrate will be determined by analytical determination on a first molten sample. This analytical determination can be effected, for example, titrimetrically (i.e. by mass analysis).

Otherwise, the procedure in the process according to the invention may be as in the prior art.

In other words, using the aqueous iron nitrate solution obtained in accordance with the invention, the remaining starting compounds of the different elemental constituents of the desired multielement oxide composition will be mixed with one another, for example, in the form of an aqueous solution and/or suspension. Particularly intimate dry mixtures are obtained when the starting materials are exclusively sources of the elemental constituents present in dissolved form. The solvent (or dispersant) used is preferably water. Subsequently, the resulting, for example aqueous, composition will be dried, in which case the drying process, advantageously on the industrial scale, is effected by spray-drying of the, for example aqueous, mixture with, for example, exit temperatures of 100 to 150° C. In principle, the drying can also be effected by freeze-drying, by conventional evaporation or by filtration and subsequent heating of the filtercake, for example in a rotary tube oven.

The stochiometry of the desired multielement oxide composition may, for example, be one of the general formula I, as recommended by EP-A 1080781, for example, as an active composition for a heterogeneously catalyzed gas phase partial oxidation of propylene to acrolein $$Mo_{12}Bi_bFe_cX^1_dX^2_eX^3_fX^4_gO_n \quad (I),\text{ and}$$

in which the variables are each defined as follows:
$X^1$=Ni and/or Co,
$X^2$=K, Na, Rb, Cs and/or Tl,
$X^3$=P, Nb, Mn, Ce, Te, W, Sb and/or Pb,
$X^4$=Si, Al, Zr and/or Ti,
b=0.1 to 10,
c=0.1 to 10,
d=2 to 20,
e=0.001 to 5,
f=0 to 5
g=0 to 30, and
n=a number which is determined by the valency and frequency of the elements in I other than oxygen.

Alternatively, the stochiometry of the desired multielement oxide composition may also be one of the general formula II, as recommended by US 2005/0131253 in general terms as an active composition for the heterogeneously catalyzed partial oxidation of an olefin to an unsaturated aldehyde:

$$Mo_{12}Bi_bCo_cNi_dFe_eX^1_fX^2_gX^3_hX^4_iSi_jO_n \quad (II),\text{ and}$$

in which the variables are each defined as follows:
$X^1$=K, Na, Rb, Cs and/or Tl,
$X^2$=P, B, As and/or W,
$X^3$=Mg, Ca, Zn, Ce and/or Sm,
$X^4$=F, Cl, Br and/or I,
b=0.5 to 7,
c=0 to 10, with the proviso that c+d=0 to 10,
d=0 to 10, with the proviso that c+d=0 to 10,
e=0.05 to 3,
f=0.0005 to 3,
g=0 to 3,
h=0 to 1,
i=0 to 0.5,
j=0 to 40, and
n=a number which is determined by the valency and frequency of the elements in II other than oxygen.

In principle, the process according to the invention also comprises the preparation of all multielement oxide compositions which comprise the element iron and are described in document 102005037678.9 and in Research Disclosure 2005,09,497 (RD 2005-497012, 20050820). These include in particular all multielement oxide compositions of the general stochiometry III, $$Mo_{12}Bi_bFe_cX^1_dX^2_eX^3_fX^4_gO_n \quad (III)$$

in which the variables are each defined as follows:
$X^1$=Ni and/or Co,
$X^2$=thallium, an alkali metal and/or an alkaline earth metal,
$X^3$=Zn, P, As, B, Sb, Sn, Ce, Pb and/or W,
$X^4$=Si, Al, Ti and/or Zr,
b=0.2 to 5,
c=0.01 to 5,
d=0 to 10,
e=0 to 2,
f=0 to 8
g=0 to 10, and
n=a number which is determined by the valency and frequency of the elements in III other than oxygen.

In other words, in particular, the process according to the invention is suitable for preparing multielement oxide compositions which, as well as oxygen and iron, comprise in particular the elements Bi and Mo. In particular, these also include the multielement oxide active compositions which are described in the documents DE-A 100 46 957, DE-A 44 07 020, EP-A 835, EP-A 575 897 and DE-C 33 38 380.

In addition, the process according to the invention is suitable for preparing multimetal oxide compositions which, as well as oxygen and iron, comprise in particular also the elements V and P and are suitable as an active composition for the heterogeneously catalyzed partial oxidation of n-butane to maleic anhydride. The stochiometry of the multielement oxide composition may then, for example, be one of the general formula IV $$V_1P_bFe_cX^1_dX^2_eO_n \quad (IV)$$

in which the variables are each defined as follows:
$X^1$=Mo, Bi, Co, Ni, Si, Zn, Hf, Zr, Ti, Cr, Mn, Cu, B, Sn and/or Nb,
$X^2$=K, Na, Rb, Cs and/or Tl,
b=0.9 to 1.5,
c=0.005 to 0.1,
d=0 to 0.1,
e=0 to 0.1, and
n=a number which is determined by the valency and frequency of the elements in IV other than oxygen.

The thermal treatment of the dry precursor composition and the drying of the wet mixture of the elemental constituents of the desired multielement oxide composition may of course merge seamlessly into one another.

Before the thermal treatment, the dried precursor composition can, if desired, be comminuted or shaped to a shaped body.

The thermal treatment (calcination), in the course of which the desired multielement oxide active composition is formed from the precursor composition, can in principle be effected either under inert gas atmosphere (e.g. $H_2O$, $N_2$, $CO_2$, noble gas or mixtures thereof) or under oxidizing atmosphere (for example under pure molecular oxygen or under a mixture of molecular oxygen and inert gases (e.g. air)), and also under reducing atmosphere (for example mixture of inert gas, $NH_3$, CO and/or $H_2$). The calcination time may be from a few minutes to a few hours and typically decreases with temperature. The calcination atmosphere may either be stationary or flowing.

The multielement oxide active compositions resulting in the calcination may, either in powder form or shaped to shaped bodies of any geometry (cf., for example, WO 02/062737), be used as catalysts for gas phase partial oxidations (for example propylene to acrolein, isobutene to methacrolein, propylene to acrylonitrile, isobutene to methacrylonitrile, n-butane to maleic anhydride, butadiene to maleic anhydride, propane to acrolein and/or acrylic acid, isobutane to methacrolein and/or methacrylic acid). As already mentioned, the shaping can be effected before or after the calcination. For example, spherical, solid cylindrical or annular unsupported catalysts can be prepared from the powder form of the multimetal oxide active composition or its uncalcined and/or partially calcined precursor composition by compaction to the desired catalyst geometry (for example by extruding or tableting), in which case it is possible if appropriate to add assistants, for example graphite or stearic acid as lubricants and/or shaping assistants, and reinforcing agents such as microfibers of glass, asbestos, silicon carbide or potassium titanate.

However, the shaping can also be effected by applying the powder form of the multimetal oxide active composition or its uncalcined and/or partially calcined, finely divided precursor composition to an inert support body (for example spherical, cylindrical or annular), in which case the application is effected, appropriately from an application point of view, with use of a liquid binder (for example water or a mixture of water and glycerol). The longest dimension (longest direct line connecting two points on the surface of the shaped catalyst body) of the resulting shaped catalyst bodies is generally from 1 to 12 mm, frequently from 2 to 10 mm. Typical calcination temperatures are from 150 to 650° C., frequently from 250 to 550° C. In general, the calcination temperature will be varied over the calcination time. Preference is given in accordance with the invention to processes which comprise the melting of iron(III) nitrate hydrates (especially of $Fe(NO_3)_3 \cdot 6H_2O$ and of $Fe(NO_3)_3 \cdot 9H_2O$; the latter is particularly preferred owing to its less marked hygroscopicity).

Finally, it should be emphasized that melting of a mixture of different iron nitrate hydrates allows the melting point to be lowered.

Advantageously in accordance with the invention, the source of the elemental constituent iron used in the process according to the invention will exclusively be an aqueous solution of iron nitrate whose preparation comprises the melting of a hydrate of iron nitrate which is present in the solid state (at 25° C., 1 bar).

Particularly advantageously, the source of the elemental constituent iron used in the process according to the invention will exclusively be the melt of a hydrate of iron nitrate which is present in the solid state (at 25° C., 1 bar).

WORKING EXAMPLE $Fe(NO_3)_3 \cdot 9H_2O$ from Dr. Paul Lohmann GmbH, D-31857 Emmerthal (13-14% by wt. of Fe, <0.2% by wt. of Na, <0.2% by wt. of K, <0.02% by wt. of $SO_4$, <0.01% by wt. of Cl) was supplied as compact, cylindrical blocks (height about 40 cm and diameter 30 cm). In a jacketed stainless steel vessel (manufacturer: Döring & Bäumer GmbH, capacity 0.2 $m^3$) were disposed 46 kg of residual melt of $Fe(NO_3)_3 \cdot 9H_2O$ which had been kept liquid with gentle stirring at a temperature of 60.5° C. by water flowing into the intermediate jacket space if required. About 125 kg of the $Fe(NO_3)_3 \cdot 9H_2O$ blocks were initially broken up into nonuniform coarse pieces by means of a crusher, and then added to the liquid residual melt. Subsequently, the jacketed tank was closed again apart from its ventilation connection. The controlled introduction of water at 90° C. into and through the jacket retained the temperature in the interior of the vessel of 60.5° C. Within 3 h, the added iron nitrate hydrate had melted completely. A subsequent titrimetric determination of the iron content of the resulting aqueous iron nitrate solution gave an iron content of 13.8% by weight of Fe. The melt of the iron nitrate hydrate was easy to keep liquid and could be metered precisely in the course of the industrial scale preparation of Fe-comprising multielement oxide compositions by discharging precalculated weights (the jacketed tank was on a mass balance). Significant decomposition of the $Fe(NO_3)_3 \cdot 9H_2O$ in the course of the melting process was not observed.

Preparation of a Dry Multimetal Oxide ($Mo_{12}Co_7Fe_{2.94}Bi_{0.6}Si_{1.59}K_{0.08}O_n$) Precursor Composition At 60° C., 319.5 kg of ammonium heptamolybdate tetrahydrate (81.5% by weight of $MoO_3$) were dissolved in 900 l of water. 1.46 kg of a 46.8% by weight aqueous potassium hydroxide solution of 20° C. were stirred into this solution while maintaining the 60° C. (to obtain an aqueous solution 1).

A second aqueous solution II was prepared by adding 179.4 kg of an aqueous $Fe(NO_3)_3 \cdot 9H_2O$ melt (13.8% by weight of Fe) at 60.5° C. with stirring to 500.6 kg of an aqueous cobalt(II) nitrate solution (12.4% by weight of Co) at 60° C. After the addition had ended, stirring was continued at 60° C. for another 30 min. Thereafter, 168.5 kg of an aqueous bismuth nitrate solution (11.2% by weight of Bi) at 20° C. were stirred in at 60° C. to obtain the aqueous solution II. Within 30 min, solution II was stirred into solution I at 60° C. 15 min after the stirring-in had ended, 28.75 kg of silica sol (from DuPont, type Ludox®, 46.80% by weight of $SiO_2$, density=1.36 to 1.42 $g/cm^3$, pH=8.5 to 9.5, alkali metal content: max. 0.5% by weight) were introduced into the resulting slurry at 60° C. While maintaining the 60° C., stirring was continued for another 15 min. The resulting slurry was then spray-dried in countercurrent (gas inlet temperature: 400±10° C., gas outlet temperature: 140±5° C.) to obtain, as the dry precursor composition, a spray powder whose ignition loss (3 h at 600° C. under air) was 30% of its weight. The particle size of the spray powder was an essentially uniform 30 μm.

Preparation of an Unsupported Multimetal Oxide Catalyst

With addition of 3.5% by weight of TIMREX T44 graphite from Timcal AG (Bodio, Switzerland), the precursor composition was shaped to annular shaped unsupported catalyst precursor bodies of annular geometry 5 mm×3 mm×2 mm (external diameter×height×internal diameter). These were subsequently calcined to the desired multimetal oxide catalyst at 500° C. (9 h) under air. This is suitable as a catalyst for the heterogeneously catalyzed gas phase partial oxidation of propylene to acrolein.

U.S. Provisional Patent Application No. 60/885,037, filed Jan. 16, 2007, is incorporated into the present patent application by literature reference.

With regard to the abovementioned teachings, numerous changes and deviations from the present invention are possible. It can therefore be assumed that the invention, within the scope of the appended claims, can be performed differently from the way described specifically herein.

The invention claimed is:

1. A process for preparing a multielement oxide composition which comprises an element iron and at least one element different from iron and oxygen in oxidic form, comprising producing a dry mixture as a precursor composition from sources comprising sources of the elements of the multielement oxide composition of which sources comprise as a source for the element iron an aqueous solution of iron nitrate; and thermally treating the precursor composition at an elevated temperature to form a shaped body, either wherein the aqueous solution of iron nitrate is a melt consisting of one or more hydrate of iron nitrate which is in the solid state at a temperature of 25° C. and a pressure of 1 bar, or wherein for preparation of the aqueous solution of iron nitrate, a melt consisting of one or more hydrate of iron nitrate which is in the solid state at a temperature of 25° C. is produced.

2. The process according to claim 1, wherein the aqueous solution of iron nitrate is the sole source of the element iron.

3. The process according to claim 1, wherein the hydrate of the iron nitrate which is in the solid state at a temperature of 25° C. and a pressure of 1 bar is one or more of $Fe(NO_3)_2 \cdot 6H_2O$, $Fe(NO_3)_3 \cdot 6H_2O$ and $Fe(NO_3)_3 \cdot 9H_2O$.

4. The process according to claim 1, the multielement oxide composition comprises Mo, Bi and Fe.

5. The process according to claim 1, wherein the source of the elemental constituent iron is exclusively the melt of one or more hydrate of iron nitrate which is present in the solid state at 25° C. and 1 bar.

6. The process according to claim 1, wherein producing a melt of one or more hydrate of iron nitrate is carried out under an inert gas atmosphere which is neither oxidizing nor reducing.

7. The process according to claim 6, wherein the inert gas comprises at least one of $N_2$, $CO_2$, and noble gases.

8. The process according to claim 1, wherein the hydrate of the iron nitrate which is in the solid state at a temperature of 25° C. and a pressure of 1 bar is one or more of $Fe(NO_3)_2 \cdot 6H_2O$ and $Fe(NO_3)_3 \cdot 6H_2O$.

9. The process according to claim 1, wherein the melting of the hydrate of iron nitrate is carried out under an inert gas atmosphere and the hydrate of the iron nitrate which is in the solid state at a temperature of 25° C. and a pressure of 1 bar is one or more of $Fe(NO_3)_2 \cdot 6H_2O$ and $Fe(NO_3)_3 \cdot 6H_2O$.

10. The process according to claim 1, wherein the multi-element oxide composition comprises following formula [I]

$$Mo_{12}Bi_bFe_cX^1_dX^2_eX^3_fX^4_gO_n \qquad \text{formula [I]}$$

wherein:
$X^1$=at least one of Ni and Co,
$X^2$=at least one of K, Na, Rb, Cs and Tl,
$X^3$=at least one of P, Nb, Mn, Ce, Te, W, Sb and Pb,
$X^4$=at least one of Si, Al, Zr and Ti,
b=0.1 to 10,
c=0.1 to 10,
d=2 to 20,
e=0.001 to 5,
f=0 to 5
g=0 to 30, and
n=a number which is determined by a valency and a frequency of elements in I other than oxygen.

11. The process according to claim 1, wherein the multi-element oxide composition comprises following formula [II]

$$Mo_{12}Bi_bCo_cNi_dFe_eX^1_fX^2_hX^4_iSi_jO_n \qquad \text{formula [II]}$$

wherein:
$X^1$=at least one of K, Na, Rb, Cs and Tl,
$X^2$=at least one of P, B, As and W,
$X^3$=at least one of Mg, Ca, Zn, Ce and Sm,
$X^4$=at least one of F, Cl, Br and I,
b=0.5 to 7,
c=0 to 10, with the proviso that c+d=0 to 10,
d=0 to 10, with the proviso that c+d=0 to 10,
e=0.05 to 3,
f=0.0005 to 3,
g=0 to 3,
h=0 to 1,
i=0 to 0.5,
j=0 to 40, and
n=a number which is determined by a valency and a frequency of elements in II other than oxygen.

12. The process according to claim 1, wherein the multi-element oxide composition comprises following formula [III]

$$Mo_{12}Bi_bFe_cX^1_dX^2_eX^3_fX^4_gO_n \qquad \text{formula [III]}$$

wherein:
$X^1$=at least one of Ni and Co,
$X^2$=at least one of thallium, an alkali metal and an alkaline earth metal,
$X^3$=at least one of Zn, P, As, B, Sb, Sn, Ce, Pb and W,
$X^4$=at least one of Si, Al, Ti and Zr,
b=0.2 to 5,
c=0.01 to 5,
d=0 to 10,
e=0 to 2,
f=0 to 8
g=0 to 10, and
n=a number which is determined by a valency and a frequency of elements in III other than oxygen.

13. The process according to claim 1, wherein the multi-element oxide composition comprises following formula [IV]

$$V_1P_bFe_cX^1_dX^2_eO_n \qquad \text{formula [IV]}$$

wherein:
$X^1$=at least one of Mo, Bi, Co, Ni, Si, Zn, Hf, Zr, Ti, Cr, Mn, Cu, B, Sn and Nb,
$X^2$=at least one of K, Na, Rb, Cs and Tl,
b=0.9 to 1.5,
c=0.005 to 0.1,
d=0 to 0.1,
e=0 to 0.1, and
n=a number which is determined by a valency and a frequency of elements in IV other than oxygen.

* * * * *

UNITED STATES PATENT AND TRADEMARK OFFICE
CERTIFICATE OF CORRECTION

| | |
|---|---|
| PATENT NO. | : 8,128,904 B2 |
| APPLICATION NO. | : 12/013693 |
| DATED | : March 6, 2012 |
| INVENTOR(S) | : Ulrich Cremer et al. |

It is certified that error appears in the above-identified patent and that said Letters Patent is hereby corrected as shown below:

Column 8, lines 48-49:
"which is in the solid state at a temperature of 25° C. is produced" should read --which is in the solid state at a temperature of 25° C. and a pressure of 1 bar is produced.--

Column 8, lines 60-61:
"which is present in the solid state at 25° C. and 1 bar" should read --which is present in the solid state at a temperature of 25° C. and a pressure of 1 bar.--

Signed and Sealed this
First Day of May, 2012

David J. Kappos
*Director of the United States Patent and Trademark Office*